(12) United States Patent
Taguchi et al.

(10) Patent No.: US 9,354,701 B2
(45) Date of Patent: May 31, 2016

(54) INFORMATION PROCESSING APPARATUS AND INFORMATION PROCESSING METHOD

(71) Applicant: FUJITSU LIMITED, Kawasaki-shi, Kanagawa (JP)

(72) Inventors: Akinori Taguchi, Kawasaki (JP); Motonobu Mihara, Kawasaki (JP); Hideki Tomimori, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/478,077

(22) Filed: Sep. 5, 2014

(65) Prior Publication Data

US 2015/0077335 A1    Mar. 19, 2015

(30) Foreign Application Priority Data

Sep. 13, 2013   (JP) .................................. 2013-191155

(51) Int. Cl.
*G06F 3/033*    (2013.01)
*G06F 3/01*     (2006.01)
*G06F 3/0485*   (2013.01)

(52) U.S. Cl.
CPC .............. *G06F 3/013* (2013.01); *G06F 3/0485* (2013.01)

(58) Field of Classification Search
CPC ...... G06F 3/013; G06F 3/011; G02B 27/0093
USPC ..................... 345/1.1, 1.3, 156, 158; 715/500
See application file for complete search history.

(56) References Cited

U.S. PATENT DOCUMENTS

| 2005/0246619 | A1* | 11/2005 | Krause ................... G06F 3/012 715/277 |
| 2012/0131491 | A1 | 5/2012 | Lee |
| 2012/0256967 | A1* | 10/2012 | Baldwin ................. G06F 3/013 345/684 |
| 2013/0021373 | A1 | 1/2013 | Vaught et al. |
| 2013/0027302 | A1* | 1/2013 | Iwaizumi .............. G06F 1/1686 345/158 |

FOREIGN PATENT DOCUMENTS

| JP | 08-22385 | 1/1996 |
| JP | 2006-107048 | 4/2006 |
| WO | 2006/100645 A2 | 9/2006 |

OTHER PUBLICATIONS

Extended European Search Report mailed Feb. 9, 2015 in related European Application No. 14183891.2.

* cited by examiner

*Primary Examiner* — Calvin C Ma
(74) *Attorney, Agent, or Firm* — Staas & Halsey LLP

(57) ABSTRACT

An information processing apparatus includes: a memory, and a processor coupled to the memory and configured to: calculate a first distance between an end of a first line in an object for reading displayed on a display screen and a beginning of a second line that is next to the first line in the object, and set, in accordance with the first distance, a condition for determining whether the object has been finished reading by a user based on detecting movement of a gaze position of the user on the display screen.

12 Claims, 18 Drawing Sheets

FIG. 1
RELATED ART

In spring it is the dawn that is most beautiful. As the light creeps over the hills, their outlines are dyed a faint red and wisps of purplish cloud trail over them. In summer ~1000

FIG. 2
RELATED ART

In spring it is the dawn that is most beautiful. As the light creeps over the hills, their outlines are dyed a faint red and wisps of purplish cloud trail over them. In summer

FIG. 3

1100 In spring it is the dawn that is most beautiful. As the light creeps over the hills, their outlines are dyed a faint red and wisps of purplish cloud trail over them. In summer

FIG. 4

| | | |
|---|---|---|
| abcde | .... | xyz |
| ABCDE | .... | WXYZ |
| fghi | .... | jkl |
| | | abc |
| | | ABC |
| | | 123 |
| abcde | .... | xyz |
| ABCDE | .... | WXYZ |
| fghi | .... | jkl |

FIG. 5 abcde .... xyz
abc
ABC
123
abc
def
abcde .... xyz

FIG. 6 abcde   ····   xyz
    abc
    ABC
      1 2 3
abcde   ····   xyz

FIG. 7 abcde   ····   xyz
          abc
ABC
      123
abcde   ····   xyz

FIG. 11

| LINE NUMBER | DISTANCE | DIRECTION |
|---|---|---|
| 1 | d1 | OPPOSITE |
| 2 | d2 | OPPOSITE |
| 3 | d3 | OPPOSITE |
| 4 | d4 | OPPOSITE |
| 5 | d5 | OPPOSITE |
| 6 | d6 | OPPOSITE |

FIG. 13

| DOCUMENT ID | THRESHOLD OF NUMBER OF TIMES NEWLINE IS DETECTED | DETERMINATION FLAG | dth |
|---|---|---|---|
| A0001 | 2 | ON | dth1 |

NEXT

FIG. 22

| LINE NUMBER | DISTANCE | VALIDITY FLAG | DETERMINATION FLAG |
|---|---|---|---|
| 1 | d1 | INVALID | OFF |
| 2 | d2 | VALID | OFF |
| 3 | d3 | INVALID | OFF |
| 4 | d4 | VALID | OFF |
| ⋮ | ⋮ | ⋮ | ⋮ |

INFORMATION PROCESSING APPARATUS AND INFORMATION PROCESSING METHOD

CROSS-REFERENCE TO RELATED APPLICATION

This application is based upon and claims the benefit of priority of the prior Japanese Patent Application No. 2013-191155 filed on Sep. 13, 2013, the entire contents of which are incorporated herein by reference.

FIELD

The embodiments discussed herein are related to technology for determining whether an object for reading has been read.

BACKGROUND

As a screen rendering and updating method for information terminals such as personal computers, tablets, smart phones, and kiosk terminals, technology that detects the gaze of a user and switches display content on the screen or performs a scroll operation in accordance with the gaze movement is available. Specifically, display on the screen is switched or the screen is scrolled after determining whether a specific area or the like has been read, thereby moderating the operation burden on the user.

In addition, the following technology that performs gaze-based screen control or the like is available. That is, a determination area is provided on an object for reading, such as text, content or the like. In the case where the coordinates of the gaze of a user are detected in that determination area, it is determined that the user is referring to that determination area. In the case where the order of parts to which the user has referred matches a predetermined order, it is determined that the user has read the object for reading, and gaze-based screen control or the like is performed.

SUMMARY

According to an aspect of the invention, an information processing apparatus includes: a memory, and a processor coupled to the memory and configured to: calculate a first distance between an end of a first line in an object for reading displayed on a display screen and a beginning of a second line that is next to the first line in the object, and set, in accordance with the first distance, a condition for determining whether the object has been finished reading by a user based on detecting movement of a gaze position of the user on the display screen.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram for describing an example of coordinates of a gaze position output by a gaze detecting device;

FIG. 2 is a diagram for describing an example of coordinates of a gaze position output by a gaze detecting device;

FIG. 3 is a diagram for describing the outline of embodiments;

FIG. 4 is a diagram for describing the outline of the embodiments;

FIG. 5 is a diagram for describing the outline of the embodiments;

FIG. 6 is a diagram for describing the outline of the embodiments;

FIG. 7 is a diagram for describing the outline of the embodiments;

FIG. 11 is a diagram illustrating an example of data stored in a fourth data storage unit;

FIG. 13 is a diagram illustrating an example of data stored in a third data storage unit according to the first embodiment;

FIG. 15 is a diagram for describing the first embodiment;

FIG. 22 is a diagram illustrating an example of data stored in the third data storage unit according to the second embodiment.

DESCRIPTION OF EMBODIMENTS

Figure 8:
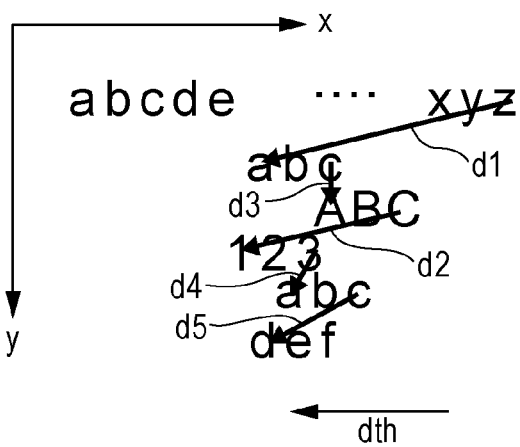
FIG. 8 is a diagram for describing the outline of the embodiments.

Hereinafter, embodiments will be described with reference to the drawings.

While inventing the present embodiments, observations were made regarding a related art. Such observations include the following, for example.

In the case of such technology, when no coordinates of the gaze are detected in a determination area on text or content, as an example of an object for reading, subjected to determination of whether the text or content has been read, whether the user has read the text or content is undeterminable. For example, if the accuracy of the coordinates of the gaze position, output by a gaze detecting device, is relatively high, as illustrated in FIG. 1, it is possible to determine in a determination area 1000 that, after the user has read the first line, as indicated by a bold line, the user has read the second line, as indicated by a bold dotted line. However, the accuracy of the coordinates of the gaze position, output by the gaze detecting device, may be low, and a detection error may be rougher than the size of characters of the text (each line) or content. In such a case, as illustrated in FIG. 2, the gaze position may not be accommodated in the determination area 1000 or may move across lines. Even if the user has finished reading the text or content, if the coordinates of the gaze position output by the gaze detecting device are simply tracked, it is impossible to detect whether the user has finished reading the text or content.

Accordingly, it is an object in one aspect of embodiments discussed herein to provide techniques for determining whether an object for reading, such as text, content or the like, with various line configurations, has been finished reading, even when the accuracy of the coordinates of a gaze position, output by a gaze detecting device, are relatively low.

First Embodiment

In a first embodiment, even when the accuracy of the coordinates of a gaze position, output by a gaze detecting device, are relatively low, in the case of text written from left to right, as an example of text of a line configuration, such as that illustrated in FIG. 3 (the same as FIG. 2), when a user reads the next line, the gaze moves from right to left, such as that indicated by an arrow 1100. This embodiment pays attention to the occurrence of such a gaze movement. By counting the number of occurrences of movement of the gaze position, which occurs when a user reads text and which corresponds to a newline (may also be referred to as a "line break"), whether text displayed on a display screen has been read (has been finished reading) is determined.

However, the length of lines included in text displayed on the display screen is not always substantially consistent, as illustrated in FIGS. 1 to 3. For example, as illustrated in FIG. 4, there are cases in which lines are horizontally written (from left to right is a reading direction), the right ends of the lines are aligned, but the middle three lines are short in length. In addition, as illustrated in FIG. 5, there are cases in which lines are horizontally written, the left ends of the lines are aligned, but lines other than the first and last lines are short in length. Further, as illustrated in FIG. 6, there are cases in which, not only lines other than the first and last lines are short in length, but also the beginning positions of the lines are not aligned. In addition, as illustrated in FIG. 7, there are cases in which, not only lines other than the first and last lines are short in length, but also the beginning positions of the lines are different.

As has been described above, this embodiment pays attention to the basic point of detecting gaze position movement corresponding to a newline. In order to handle line configurations like those illustrated in FIGS. 4 to 7, as examples of various line configurations, by detecting a line where gaze position movement corresponding to a newline occurs, which is appropriately detectable, a threshold of the number of times a newline is detected is appropriately set.

Specifically, in this embodiment, on the basis of a distance d from the end of each line to the beginning of the next line, a threshold of the number of times a newline is detected is determined. In the example illustrated in FIG. 8, for the first line, a distance d1 from the character "z" at the end to the character "a" at the beginning of the second line is calculated. If this length d1 is less than or equal to a length dth of a range in which characters are readable without moving gaze, the first line is readable without moving gaze, and thus no gaze movement is detected. Therefore, if the relationship is d1>dth, the threshold of the number of times a newline is detected is incremented by one.

Similarly, a distance d3 from the character "c" at the end of the second line to the character "A" at the beginning of the third line, a distance d2 from the character "C" at the end of the third line to the character "1" at the beginning of the fourth line, a distance d4 from the character "3" at the end of the fourth line to the character "a" at the beginning of the fifth line, and a distance d5 from the character "c" at the end of the fifth line to the character "e" at the beginning of the sixth line are calculated.

For example, if only d1 and d2 are each longer than dth, the threshold of the number of times a newline is detected becomes "2".

Note that, for distance, Euclidean distance may be used, or, for example, as illustrated in FIG. 8, in the case where the reading direction is the x-axis direction, the difference between an x-coordinate value at the end position of a certain line and an x-coordinate value at the beginning position of the next line may be treated as distance.

Figure 9:
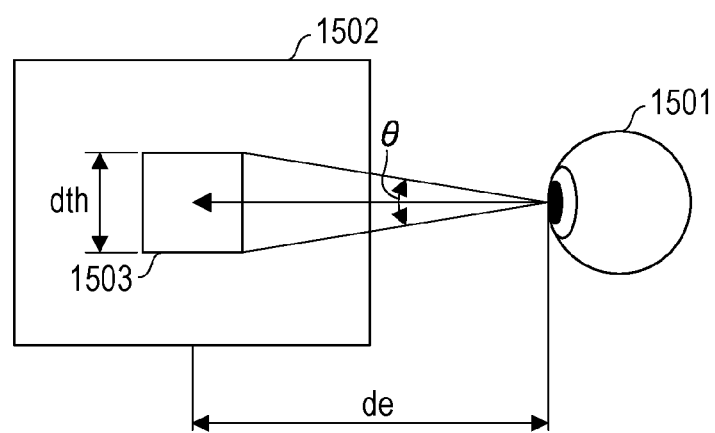
FIG. 9 is a diagram for describing a range in which characters are readable without moving gaze.

Note that, as schematically illustrated in FIG. 9, a rectangular area 1503 on a plane 1502 separated by a distance de from an eye 1501 is a range in which characters are readable without moving gaze, and one length dth of the area 1503 is represented as follows:

$$dth = 2de^{*}\tan(\theta/2)$$

where θ represents a viewing angle of the eye 1501.

For example, in the case where a gaze detecting device used has a function of detecting the distance de to the user's eye 1501, the value of the distance de is obtained. If the value of the distance de is not obtained, a constant such as 0.5 m, which is generally assumed, may be used, or the distance de may be input by the user. For θ, an angle of 2.5°, which is generally the central vision of a human being that identifies characters and the like, may be used. Further, as an initial process, the user may be caused to gaze at one point on the screen, characters may be arranged around that point, and a character farthest from the point among characters readable by the user may be identified, thereby determining dth itself.

Figure 10:
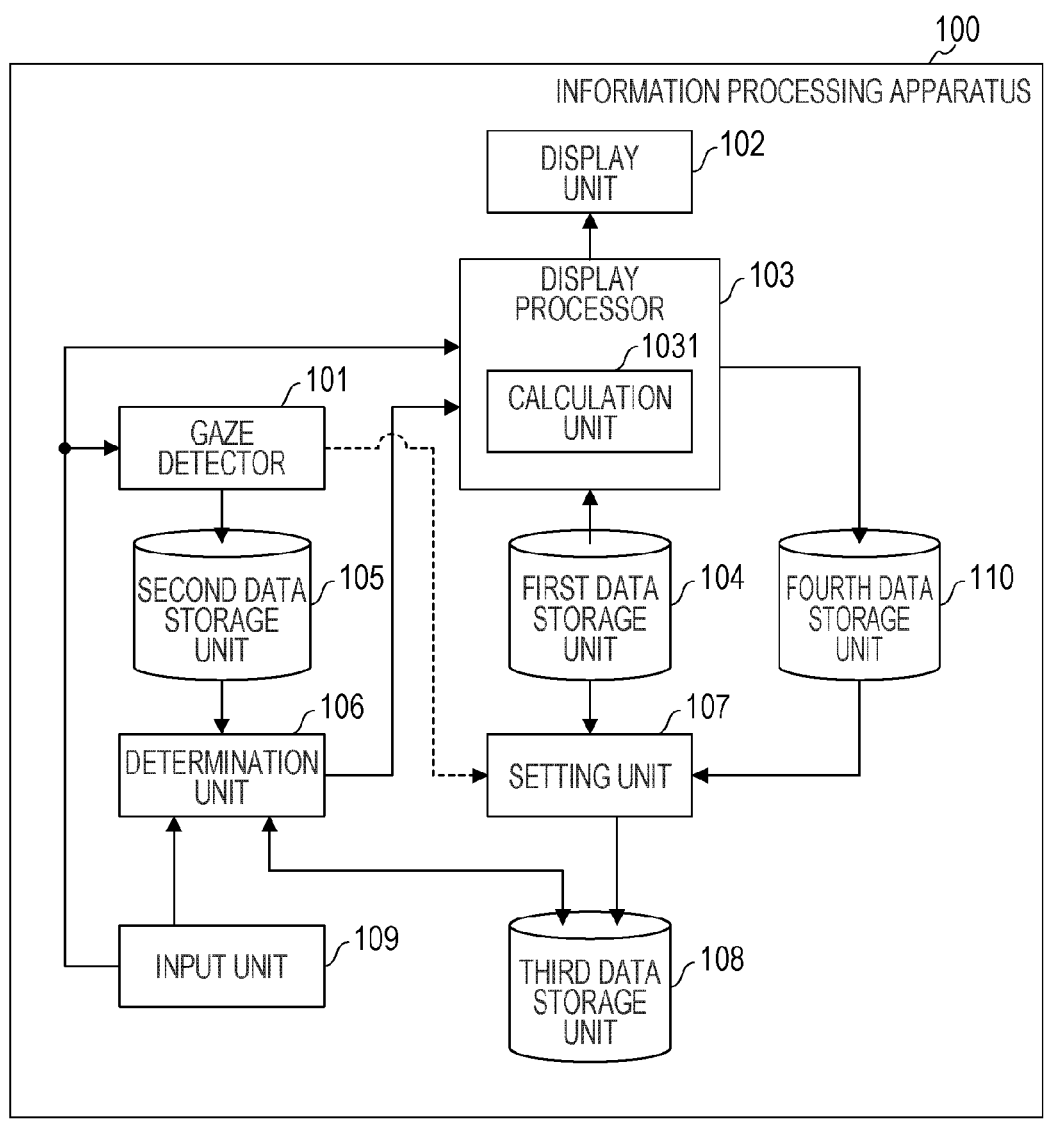
FIG. 10 is a functional block diagram of an information processing apparatus according to the embodiments.

FIG. 10 is a functional block diagram of an information processing apparatus according to this embodiment. An information processing apparatus 100 according to this embodiment includes a gaze detector 101, a display unit 102, a display processor 103, a first data storage unit 104, a second data storage unit 105, a determination unit 106, a setting unit 107, a third data storage unit 108, an input unit 109, and a fourth data storage unit 110.

The gaze detector 101 detects the coordinates of the gaze position on a display screen of the display unit 102, and stores the coordinates in the second data storage unit 105. In this embodiment, since the gaze detector 101 may be configured with any available mechanism and algorithm, a detailed description thereof is omitted. Note that, as has been described in relation to FIG. 9, the gaze detector 101 may sometimes obtain data for determining dth or dth itself and output the data or dth to the setting unit 107.

The first data storage unit 104 stores text data subjected to determination of whether a user has read the text, and setting data. The setting data includes, for example, the distance threshold dth. The display processor 103 reads the text data stored in the first data storage unit 104, and outputs the data to the display unit 102.

The display processor 103 includes a calculation unit 1031. The calculation unit 1031 calculates a distance d and a direction between the end of each line of text displayed on a display screen of the display unit 102 and the beginning of the next line, and stores the distance d and the direction in the fourth data storage unit 110. The fourth data storage unit 110 stores, for example, data such as that illustrated in FIG. 11. In the example illustrated in FIG. 11, for each line, a line number, a distance d from the end of the line to the beginning of the next line, and its direction (the reading direction is indicated as "positive", and a direction opposite to the reading direction is indicated as "negative") are stored.

Using the setting data and the like stored in the first data storage unit 104 and the data stored in the fourth data storage unit 110, the setting unit 107 generates determination rule data used by the determination unit 106, and stores the determination rule data in the third data storage unit 108.

For example, in response to an instruction from the input unit 109, from the gaze position coordinates stored in the second data storage unit 105, the determination unit 106 determines whether text displayed on the display unit 102 has been read using the determination rule data stored in the third data storage unit 108, and stores the determination result in the third data storage unit 108. Further, there are cases in which the determination unit 106 causes the display processor 103 to output the determination result to the display unit 102.

Next, a pre-process executed in response to, for example, an instruction from the input unit 109 to display text will be described.

Figure 12:
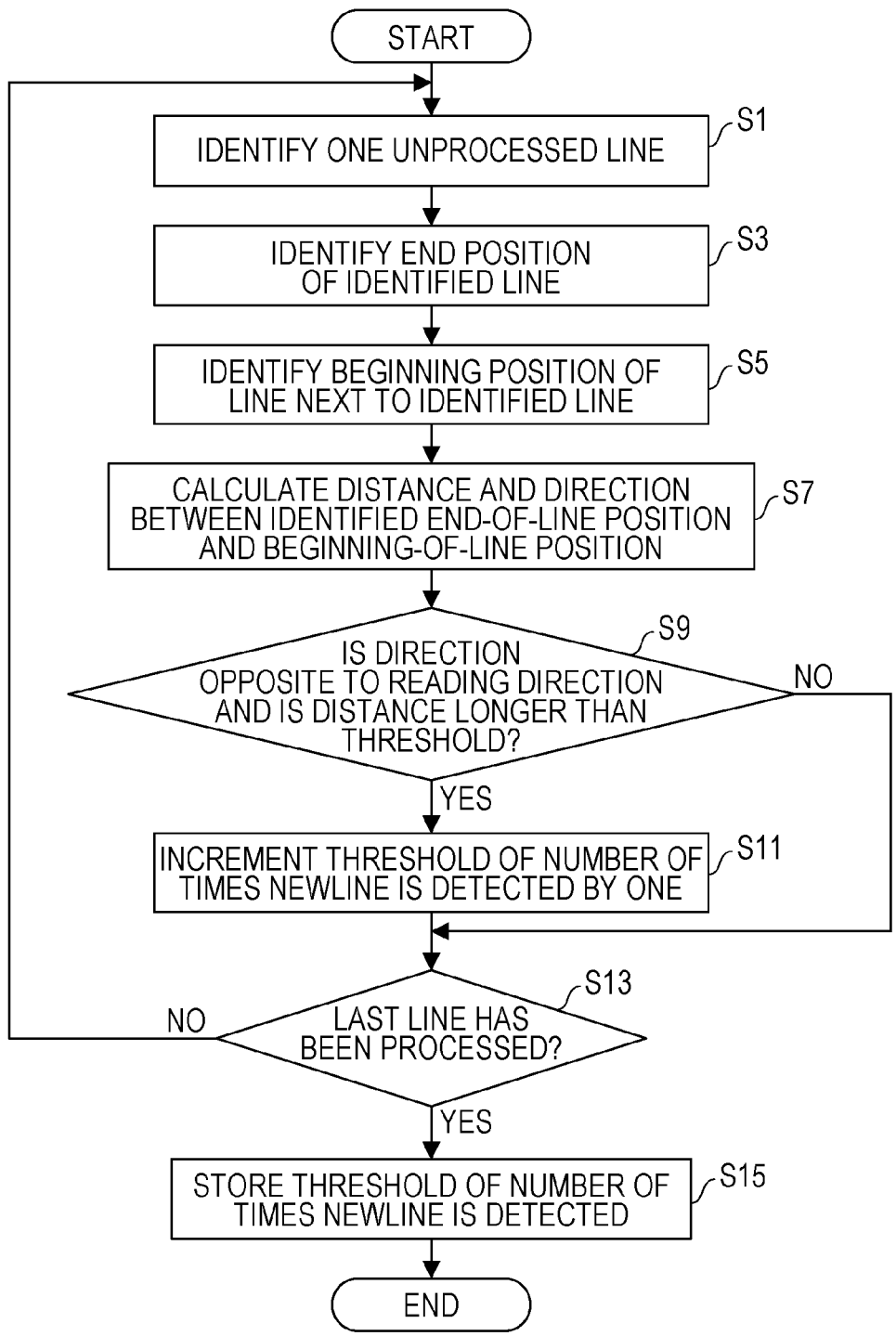
FIG. 12 is a flowchart illustrating a pre-process according to a first embodiment.

The calculation unit 1031 sequentially identifies one unprocessed line from the beginning (step S1 in FIG. 12). In addition, the calculation unit 1031 identifies the end position of the identified line (step S3), and further identifies the beginning position of a line next to the identified line (step S5). As the end-of-line position, for example, the center of a character at the end of the line is used; and, as the beginning-of-line position, for example, the center of a character at the beginning of the line is used. In addition, if the end of the line is a symbol such as a period or a comma, the end of the line may be determined without including such symbols. If the beginning of the line is a symbol such as a parenthesis or a centered dot (a symbol in a list), the beginning of the line may be determined without including such symbols.

The calculation unit 1031 identifies the distance and direction between the identified end-of-line position and beginning-of-line position, and stores the distance and direction in the fourth data storage unit 110 (step S7). For the direction, whether the direction is the text reading direction or a direction opposite to the reading direction is identified. In the example illustrated in FIG. 8, if the x-coordinate value at the beginning-of-line position—the x-coordinate value at the end-of-line position is a positive value, the direction is a direction opposite to the reading direction; and, if that value is a negative value, the direction is the reading direction.

Then, the setting unit 107 determines, on the basis of data stored in the fourth data storage unit 110, whether the direction is a direction opposite to the reading direction and the distance is longer than the threshold dth (step S9).

In the case where the direction is the reading direction or the distance is less than or equal to the threshold dth, the process proceeds to step S13. In contrast, in the case where the direction is a direction opposite to the reading direction and the distance is longer than the threshold dth, the setting unit 107 increments the threshold of the number of times a newline is detected by one (step S11). Thereafter, the process proceeds to step S13.

The calculation unit 1031 determines whether the displayed text has been processed to the last line (step S13). For example, in the case where the process completes processing the number of lines that is −1 of the number of lines included in the text, it means that the text has been processed to the last line. If there is/are (an) unprocessed line(s), the process returns to step S1.

In contrast, if the text has been processed to the last line, the setting unit 107 stores the determination rule data including the threshold of the number of times a newline is detected in the third data storage unit 108 (step S15).

The third data storage unit 108 stores, for example, data like that illustrated in FIG. 13. In the example illustrated in FIG. 13, the document identifier (ID) of displayed text, the threshold of the number of times a newline is detected, a determination flag indicating whether text has been read, and the distance threshold dth are stored. The document ID may be obtained from the display processor 103, or may be read from the first data storage unit 104. As has been mentioned above, dth may be included in the setting data stored in the first data storage unit 104, or may be obtained from the gaze detector 101.

Next, a process performed while the user is actually reading will be described using FIG. 14.

For example, in response to an instruction given from the user to display certain text using the input unit 109, the process illustrated in FIG. 12 is performed, and the display processor 103 reads data of that text from the first data storage unit 104 and displays the text data on the display unit 102. In addition, in response to an instruction given from the user to display certain text using the input unit 109, the gaze detector 101 detects the coordinates of the gaze position, and stores the coordinates in the second data storage unit 105.

Figure 14:
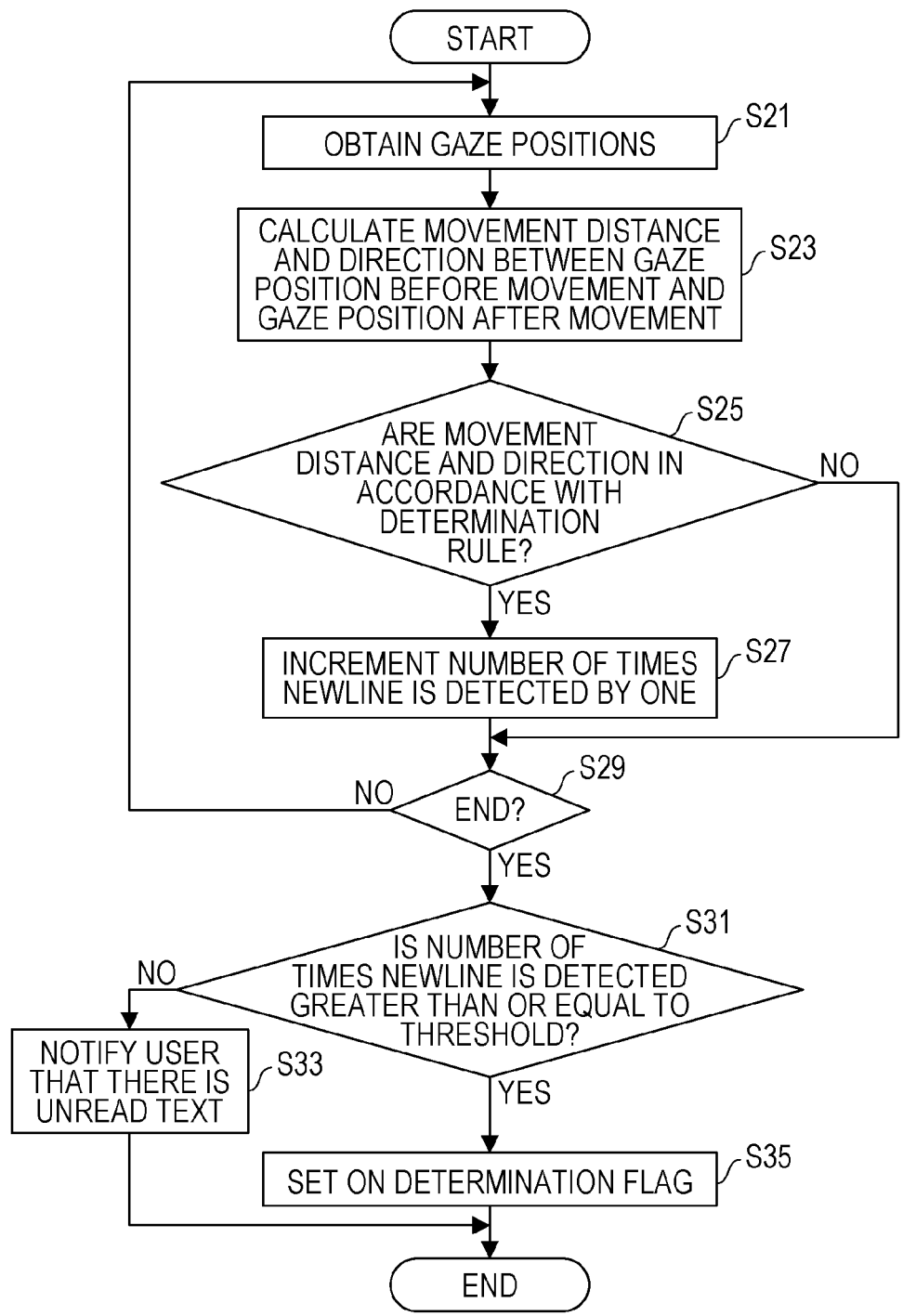
FIG. 14 is a flowchart illustrating a process according to the first embodiment.

The determination unit 106 reads the data of the coordinates of the newest gaze position and the coordinates of the gaze position one unit time ago, which are stored in the second data storage unit 105 (step S21 in FIG. 14).

Then, the determination unit 106 determines the movement distance and direction between the gaze position before the movement and the gaze position after the movement on the display screen (step S23). As has been mentioned above, in this embodiment, the movement distance may be Euclidian distance or the difference between coordinate values in an axis direction parallel to the reading direction.

The determination unit 106 determines whether the movement distance and direction follow the determination rule stored in the third data storage unit 108 (step S25).

Since gaze position movement corresponding to a newline is handled in this embodiment, whether the movement distance that is longer than the threshold dth stored in the third data storage unit 108 is detected, and whether the movement direction is opposite to the reading direction is determined.

In the case where the conditions in step S25 are satisfied, the determination unit 106 increments the number of times a newline is detected by one (step S27). Then, the process proceeds to step S29. In contrast, even in the case where the conditions in step S25 are not satisfied, the process proceeds to step S29.

The determination unit 106 determines whether an end event has occurred, such as the case in which, for example, the user has given an instruction that the text has been completely read, or a preset time has elapsed (step S29). In the case where no end event has occurred, the process returns to step S21.

In contrast, in the case where an end event has occurred, the determination unit 106 determines whether the number of times a newline is detected is greater than or equal to the threshold stored in the third data storage unit 108 (step S31).

In the case where the condition in step S31 is not satisfied, the determination unit 106 causes the display processor 103 to display a message indicating that there is unread text on the display unit 102 (step S33). Then, the process ends. Note that an instruction may be given to re-read the text from the beginning.

In contrast, in the case where the condition in step S31 is satisfied, it is determined that the displayed text has been read. Thus, the determination unit 106 sets "on" the determination flag for this text in the third data storage unit 108 (step S35). Thereafter, the determination unit 106 may cause the display processor 103 to display a message indicating completion on the display unit 102. Accordingly, the process ends.

In the example such as that described using FIG. 8, since there are two lines exceeding dth, if two gaze movements exceeding dth are detected, it is determined that the text illustrated in FIG. 8 has been read.

Figure 15:
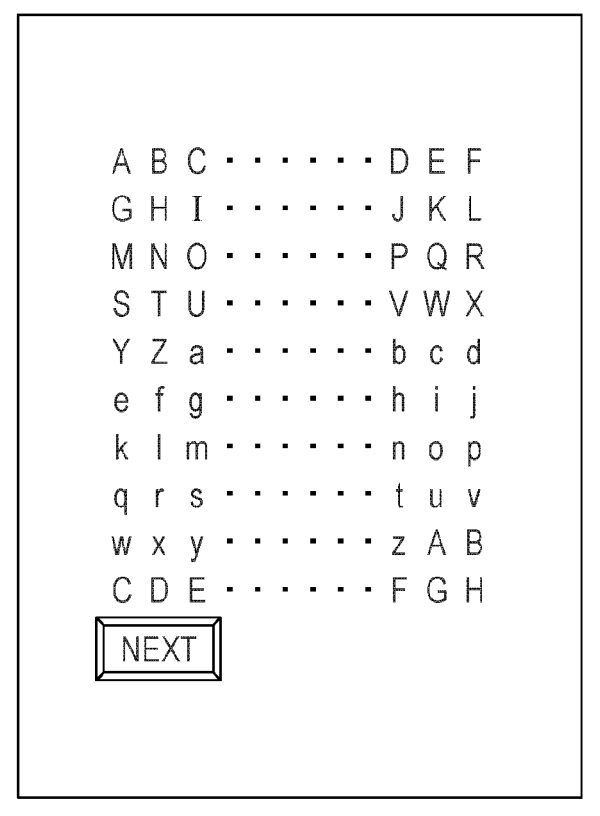

In contrast, as illustrated in FIG. 15, in the case where lines have the same length, if there are ten lines, nine gaze movements, corresponding to newlines, occur. Thus, if nine gaze movements exceeding dth are detected, it is determined that the text illustrated in FIG. 15 has been read.

Figure 16:
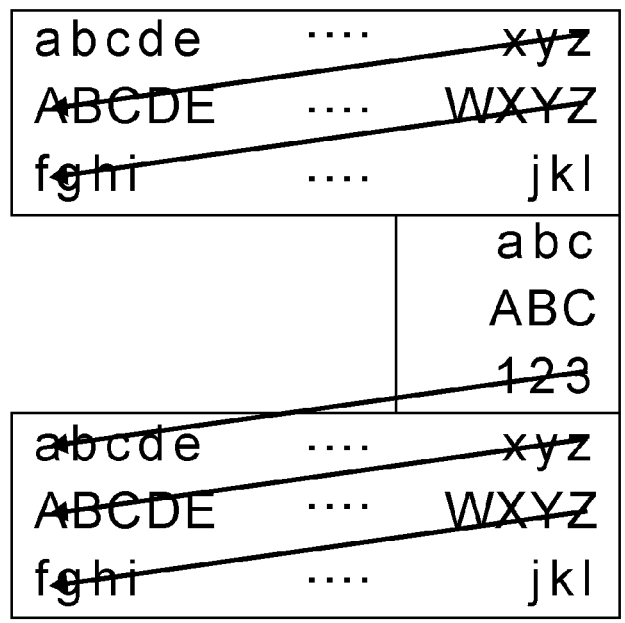
FIG. 16 is a diagram for describing the first embodiment.

Note that, in the case of the example illustrated in FIG. 4, as illustrated in FIG. 16, there are five movements, from the end of a certain line to the beginning of the next line, which exceeds the threshold dth. Thus, the threshold of the number of times a newline is detected becomes "5".

Figure 17:
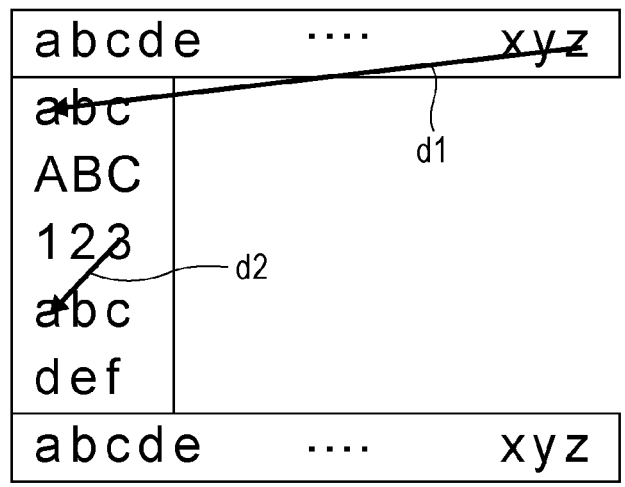
FIG. 17 is a diagram for describing the first embodiment.

In addition, in the case of the example illustrated in FIG. 5, as illustrated in FIG. 17, only the distance d1, from the end position of the first line to the beginning position of the second line, exceeds the threshold dth, and the other distance d2 does not exceed the threshold dth. Thus, the threshold of the number of times a newline is detected becomes "1".

Figure 18:
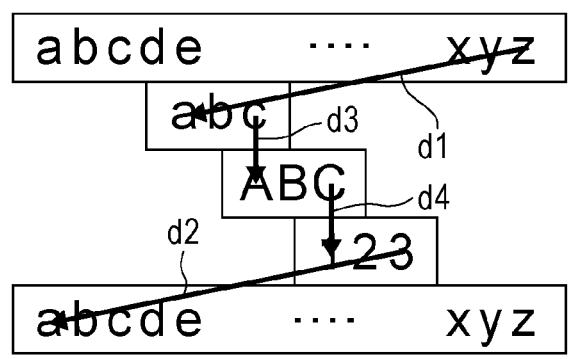
FIG. 18 is a diagram for describing the first embodiment.

In the case of the example illustrated in FIG. 6, as illustrated in FIG. 18, only the distance d1, from the end position of the first line to the beginning position of the second line, and the distance d2, from the end position of the fourth line to the beginning position of the fifth line, exceed the threshold dth, and the other distances d3 and d4 do not exceed the threshold dth. Thus, the threshold of the number of times a newline is detected becomes "2".

Figure 19:
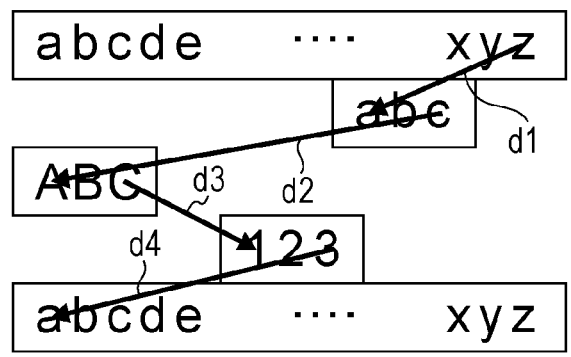
FIG. 19 is a diagram for describing the first embodiment and a second embodiment.

In the case of the example illustrated in FIG. 7, as illustrated in FIG. 19, only the distance d2, from the end position of the second line to the beginning position of the third line, and the distance d4, from the end position of the fourth line to the beginning position of the fifth line, exceed the threshold dth, and the other distances d1 and d3 (d3 even has an opposite direction) do not exceed the threshold dth. Thus, the threshold of the number of times a newline is detected becomes "2".

Note that, as the above-mentioned threshold dth, a corrected value obtained by taking into consideration the length e of a gaze detection error (for example, the length dth of a range that is readable without moving gaze+2e) may be used. In addition, there are cases in which a value corrected appropriately on the basis of the distance dth of a range that is readable without moving gaze is used. Note that the value of the length e of a gaze detection error may be changed in accordance with the gaze position, such that, for example, the length e may be made smaller in a screen central portion and may be made greater toward a screen peripheral portion. In addition, although this embodiment assumes text read from left to right, the same or similar processing is possible even when the reading direction is different.

Second Embodiment

In a second embodiment, whether text has been read is determined by generating a determination rule for specific gaze movement for each of lines included in the text, not for the number of times gaze movement exceeding the threshold dth is detected.

For example, in the case illustrated in FIG. 19, the first line is d1≤dth and is thus undetectable, but the second line is d2>dth, has a direction opposite to the reading direction, and is thus detectable. Thus, d2 is set as a determination rule. Further, the third line is d3≤dth and is thus undetectable, but the fourth line is d4>dth, has a direction opposite to the reading direction, and is thus detectable. Thus, d4 is set as a determination rule.

Before actually performing a process of determining whether text has been read, in the case where gaze movement in a direction opposite to the reading direction is detected, whether that gaze movement matches d2 is determined in comparison with gaze position movement detected when the second line is read, while an error is taken into consideration. Thereafter, in the case where gaze movement in a direction opposite to the reading direction is detected, whether that gaze movement matches d4 is determined in comparison with gaze position movement detected when the fourth line is read, while an error is taken into consideration. If gaze movement that follows such a determination rule is detected, it is determined that the text has been read.

The specific details of a process will be described using FIGS. 20 to 22.

Figure 20:
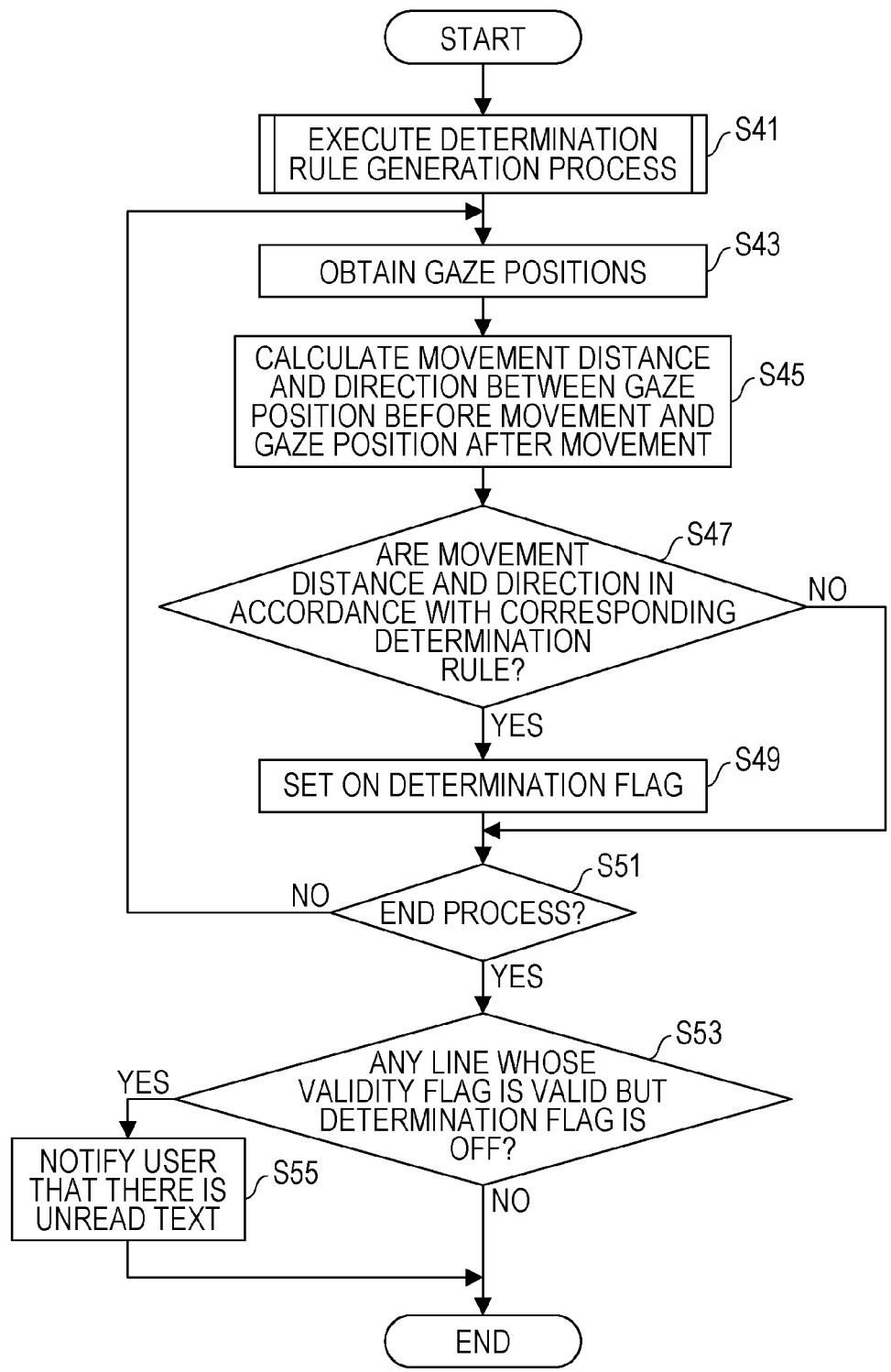
FIG. 20 is a flowchart illustrating a process according to the second embodiment.

For example, in response to an instruction given from the input unit 109 to display text, the calculation unit 1031 and the setting unit 107 execute a determination rule generation process (step S41 in FIG. 20). The determination rule generation process will be described using FIG. 21. Note that the determination rule generation process may be executed as a preprocess as above, or may be executed in parallel to processing from step S43 onward.

Figure 21:
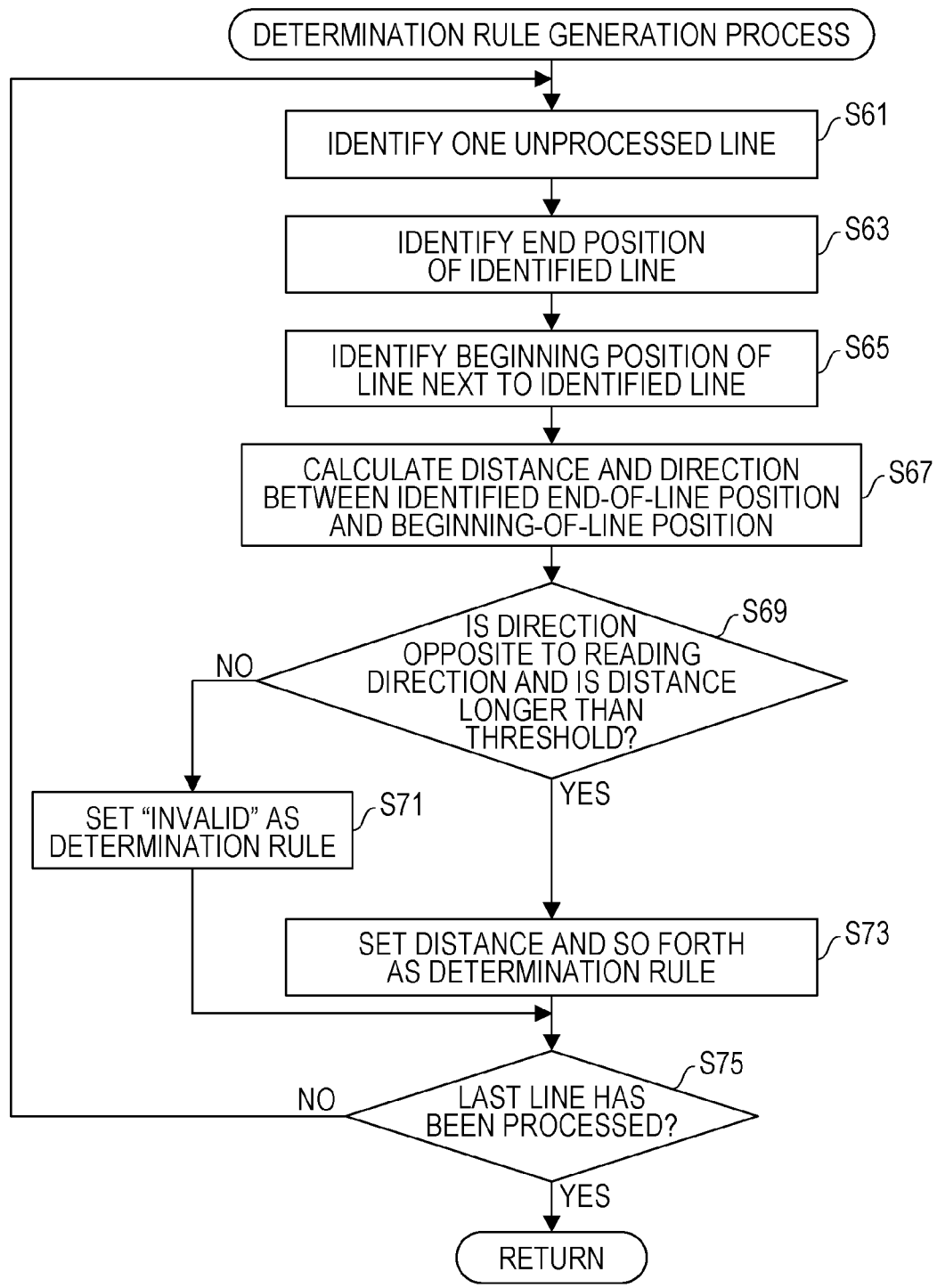
FIG. 21 is a flowchart illustrating a determination rule generation process.

First, the calculation unit 1031 sequentially identifies one unprocessed line from the beginning (step S61 in FIG. 21). In addition, the calculation unit 1031 identifies the end position of the identified line (step S63), and further identifies the beginning position of a line next to the identified line (step S65). As the end-of-line position, for example, the center of a character at the end of the line is used; and, as the beginning-of-line position, for example, the center of a character at the beginning of the line is used.

The calculation unit 1031 identifies the distance and direction between the identified end-of-line position and beginning-of-line position, and stores the distance and direction in the fourth data storage unit 110 (step S67). Data stored in the fourth data storage unit 110 is the same as or similar to that in the first embodiment.

Then, the setting unit 107 determines, on the basis of data stored in the fourth data storage unit 110, whether the direction is a direction opposite to the reading direction and the distance is longer than the threshold dth (step S69). The threshold dth is the same as or similar to that in the first embodiment.

In the case where the direction is the reading direction or the distance is less than or equal to the threshold dth, the setting unit 107 sets "invalid" as a determination rule (step S71). Then, the process proceeds to step S75. In contrast, in the case where the direction is a direction opposite to the reading direction and the distance is longer than the threshold dth, the setting unit 107 sets distance or the like as a determination rule (step S73). Thereafter, the process proceeds to step S75.

In this embodiment, for example, data such as that illustrated in FIG. 22 is stored in the third data storage unit 108. In the example illustrated in FIG. 22, the line number which is the identifier of each line, the calculated distance, a validity flag indicating whether the conditions in step S69 are satisfied, and the determination flag area stored. The determination flag is set by processing from step S43 onward. In the case where the validity flag is invalid, the determination flag is not set "on".

The calculation unit 1031 determines whether the displayed text has been processed to the last line (step S75). For example, in the case where the process completes processing the number of lines that is −1 of the number of lines included in the text, it means that the text has been processed to the last line. If there is/are (an) unprocessed line(s), the process returns to step S61. In contrast, if the text has been processed to the last line, the process returns to the calling process.

Accordingly, the determination rule for each line is set in the third data storage unit 108.

The description returns to the process illustrated in FIG. 20. In response to an instruction to display certain text, the display processor 103 reads data of that text from the first data storage unit 104, and displays the text data on the display unit 102. In addition, in response to an instruction given by a user to display certain text using the input unit 109, the gaze detector 101 detects the coordinates of the gaze position, and stores the coordinates in the second data storage unit 105.

The determination unit 106 reads the data of the coordinates of the newest gaze position and the coordinates of the gaze position one unit time ago, which are stored in the second data storage unit 105 (step S43 in FIG. 20).

Then, the determination unit 106 calculates the movement distance and direction between the gaze position before the movement and the gaze position after the movement on the display screen (step S45). As has been mentioned above, in this embodiment, the movement distance may be Euclidian distance or the difference between coordinate values in an axis direction parallel to the reading direction.

The determination unit 106 determines whether the movement distance and direction follow a corresponding one of the determination rules stored in the third data storage unit 108 (step S47).

Since gaze position movement corresponding to a newline is handled in this embodiment, whether the movement direction is opposite to the reading direction is determined. In addition, whether the movement distance matches the distance stored in the third data storage unit 108 is determined, while an error is taken into consideration. For example, a gaze detection error e is taken into consideration, and whether the movement distance is within a range that is ±2e of the distance d is determined.

Note that, while assuming that the lines are sequentially read from the top, the determination rules stored in the third data storage unit 108 are sequentially applied. In the example illustrated in FIG. 22, since the validity flag for the first line is invalid, if gaze movement in a direction opposite to the reading direction is detected, this gaze movement is compared with the distance set for the second line. When the determination flag for the second line is set "on", since the validity flag for the third line is invalid, if gaze movement in a direction opposite to the reading direction is detected, this gaze movement is compared with the distance set for the fourth line.

In the case where it is determined that the currently detected movement distance and direction follow a corresponding one of the determination rules in step S47, the determination unit 106 sets "on" the determination flag for a line determined to follow the determination rule (step S49). Then, the process proceeds to step S51. In contrast, in the case where it is determined that the currently detected movement distance and direction do not follow a corresponding one of the determination rules in step S47, the process proceeds to step S51.

The determination unit 106 determines whether to end the process, such as in the case where lines whose validity flags are valid are determined in accordance with the determination rules, and the user has given an instruction that the text has been completely read or a preset time has elapsed (step S51). If the process is not to be ended, the process returns to step S43.

If the process is to be ended, the determination unit 106 refers to the third data storage unit 108 and determines whether there is any line whose validity flag is valid but determination flag is off (step S53). In the case where the condition in step S53 is satisfied, the determination unit 106 causes the display processor 103 to display a message indicating that there is unread text on the display unit 102 (step S55). Then, the process ends. Note that an instruction may be given to re-read the text from the beginning. Alternatively, an instruction may be given to re-read the text from a line whose determination flag is off or from its neighboring line.

In contrast, in the case where the condition in step S53 is not satisfied, it is determined that the displayed text has been read. Thus, the process ends. Note that the determination unit 106 may cause the display processor 103 to display a message indicating completion on the display unit 102. In addition, that text may be set as "read". Accordingly, the process ends.

By performing the above-described process, it is possible to perform determination of whether text has been read for each line whose calculated distance, from the end of the line to the beginning of the next line, exceeds the threshold dth, thereby improving the accuracy of a process of determining whether text has been read.

The above-described examples discuss the case in which only gaze movement in a direction opposite to the reading direction is handled. When the distance from the end of a line to the beginning of the next line exceeds the threshold dth, that movement is detectable even when the movement is in the reading direction. For example, in the case where the reading direction is set to be from left to right, if the end of a line is toward the left end and the beginning of the next line is toward the right end, when a determination rule includes direction data, it is possible to determine whether text has been read by detecting gaze movement whose movement distance exceeds the threshold dth though that movement may be in the reading direction.

Although the embodiments have been described as above, the embodiments are not limited to the above-described examples. For example, the above-described functional block configuration of the information processing apparatus 100 illustrated in FIG. 10 is only one example and may not match a program module configuration in some cases. Further, the configuration of each data storage unit may be different from a file configuration. In addition, the embodiments may apply to content including text, for determining whether the content has been finished reading.

Further, regarding the process flows, similarly, the order of the steps may be changed or a plurality of steps may be executed in parallel as long as the processing result remains unchanged.

Figure 23:
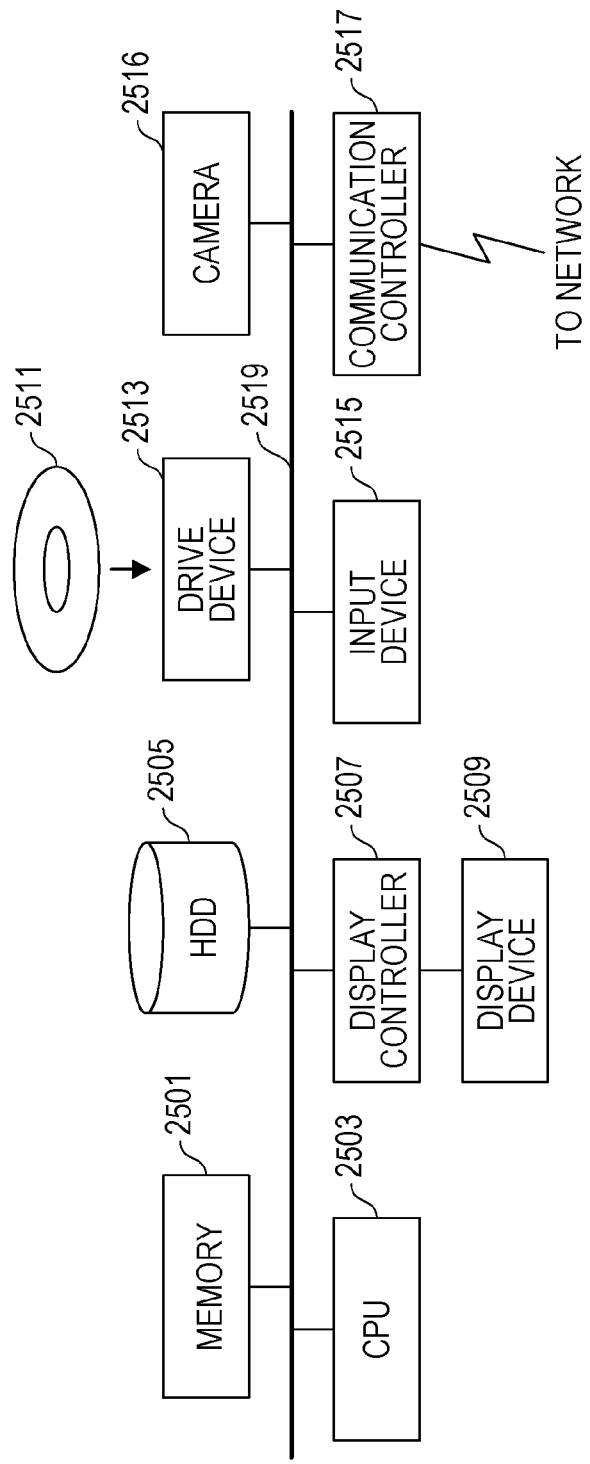
FIG. 23 is a functional block diagram of a computer.

Note that the above-described information processing apparatus 100 is a computer apparatus. As illustrated in FIG. 23, a memory 2501, a central processing unit (CPU) 2503, a hard disk drive (HDD) 2505, a display controller 2507 connected to a display device 2509, a drive device 2513 for a removable disk 2511, an input device 2515, a communication controller 2517 for connecting to a network, and a camera 2516 for capturing an image of a user in order to detect the user's gaze are connected by a bus 2519. An operating system (OS) and an application program for performing processes in the embodiments are stored in the HDD 2505, and, when the CPU 2503 executes the application program, the program is read from the HDD 2505 to the memory 2501. In accordance with the details of processing of the application program, the CPU 2503 controls the display controller 2507, the communication controller 2517, and the drive device 2513 to perform certain operations. In addition, although data being processed is mainly stored in the memory 2501, the data may be stored in the HDD 2505. In the embodiments, an application program for performing processes described in the embodiments is stored in the computer-readable removable disk 2511 and distributed, and installed from the drive device 2513 to the HDD 2505. In some cases, the application program may be installed in the HDD 2505 via a network, such as the Internet, and the communication controller 2517. Such a computer apparatus realizes various functions such as those described above by organic cooperation between hardware such as the above-described CPU 2503 and memory 2501 and a program such as the above-described application program.

The above-described embodiments are summarized as below.

An information processing apparatus according to the embodiments includes: (A) a calculation unit configured to calculate a distance between an end of a first line included in text displayed on a display screen and a beginning of a second line that is next to the first line; and (B) a setting unit configured to set, in accordance with the calculated distance, a condition for determining whether the text has been read by detecting movement of a gaze position.

Accordingly, even when lines are not left-justified, for example, it is possible to determine whether text has been read by detecting gaze movement.

Note that, in a case where the calculated distance exceeds a distance threshold set in accordance with a range that is readable without moving the gaze position, the above-described setting unit may include a process of increasing a threshold of the number of times used in counting the number of times movement of the gaze position is movement indicating a newline (may also be referred to as a "line break"). In the case of determining whether text has been read on the basis of the number of times, it is possible to set an appropriate threshold.

Further, in a case where the calculated distance exceeds a distance threshold set in accordance with a range that is readable without moving the gaze position, the above-described setting unit may include a process of setting a distance in accordance with the calculated distance to a comparison reference value used in comparison for determination of whether movement of the gaze position is movement indicating a line break. In the case of determining whether text has been read on a line by line basis instead of on the basis of the number of times, it is possible to set an appropriate comparison reference value for each line satisfying the condition.

In addition, the information processing apparatus which determines whether text has been read on the basis of the number of times may further include a determination unit configured to obtain the gaze position on the display screen, to count the number of times a distance of movement of the gaze position in a direction opposite to a direction in which the text is read exceeds the distance threshold, and, in a case where the counted number of times becomes greater than or equal to the threshold of the number of times set by the setting unit, to store data representing that the text has been read in a data storage unit. Accordingly, it is possible to appropriately determine whether text has been read on the basis of the number of times.

Further, the information processing apparatus which determines whether text has been read on a line by line basis may further include a determination unit configured to obtain the gaze position on the display screen, to determine whether a distance of movement of the gaze position in a direction opposite to a direction in which the text is read matches the comparison reference value set by the setting unit, and, in a case where it is determined that the movement distance of the gaze position matches the comparison reference value, to store data representing that the first line has been read in a data storage unit. Accordingly, it becomes possible to appropriately determine whether text has been read on a line by line basis. If the setting unit additionally sets data representing a direction, it becomes possible to handle not only gaze movement in a direction opposite to the reading direction, but also gaze movement in the same direction as the reading direction.

Note that a program for causing a computer to execute a process such as that described above may be generated. The program is stored in a computer-readable storage medium such as a flexible disk, an optical disc such as a compact-disc read-only memory (CD-ROM), a magneto-optical disc, a semiconductor memory (such as a ROM), or a hard disk, or a storage device. Note that data being processed is temporarily stored in a storage device such as a random-access memory (RAM).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus, comprising:
a memory, and
a processor coupled to the memory and configured to:
calculate a first distance between an end of a first line in a reading object displayed on a display screen and a beginning of a second line following the first line in the reading object,
set a condition, based on the first distance and a first threshold specifying a readable range without moving a gaze position by a user, for detecting movement of a gaze position of the user on the display screen, and
determine whether the reading object has been read by the user based on the detecting movement of the gaze position of the user on the display screen.

2. The information processing apparatus according to claim 1, wherein the processor is configured to:
increase a second threshold counting the number of times where movement of the gaze position indicates a newline when the first distance exceeds the first threshold.

3. The information processing apparatus according to claim 2, wherein the processor is configured to:
obtain the gaze position on the display screen,
count the number of times where a third distance of movement of the gaze position in a direction opposite to a direction in which the text is read exceeds the first threshold, and
store data representing that the reading object has been read in a data storage when the counted number of times becomes greater than or equal to the second threshold.

4. The information processing apparatus according to claim 1, wherein the process is configured to:
set a second distance in accordance with the first distance to a reference value used in comparison for determining whether movement of the gaze position indicates a line break when the first distance exceeds the first threshold.

5. The information processing apparatus according to claim 4, wherein the processor is configured to:
obtain the gaze position on the display screen,
determine whether a third distance of movement of the gaze position in a direction opposite to a direction in which the text is read matches the reference value, and store data representing that the first line has been read in a data storage when the third distance matches the reference value.

6. The information processing apparatus according to claim 1, wherein the reading object includes text of a line configuration having the first line and the second line.

7. An information processing method, comprising:
- calculating a first distance between an end of a first line in a reading object displayed on a display screen and a beginning of a second line following the first line in the reading object;
- setting by a processor a condition, based on the first distance and a first threshold specifying a readable range without moving a gaze position by a user, for detecting movement of a gaze position of the user on the display screen; and
- determining whether the reading object has been read by the user based on the detecting movement of the gaze position of the user on the display screen.

8. The information processing method according to claim 7,
- wherein the setting increases a second threshold counting the number of times where movement of the gaze position indicates a newline when the first distance exceeds the first threshold.

9. The information processing method according to claim 8, further comprising:
- obtaining the gaze position on the display screen;
- counting the number of times where a third distance of movement of the gaze position in a direction opposite to a direction in which the text is read exceeds the first threshold; and
- storing data representing that the object has been read in a data storage when the counted number of times becomes greater than or equal to the second threshold.

10. The information processing method according to claim 7,
- wherein the setting sets a second distance in accordance with the first distance to a reference value used in comparison for determining whether movement of the gaze position indicates a line break when the first distance exceeds the first threshold.

11. The information processing method according to claim 10, further comprising:
- obtaining the gaze position on the display screen;
- determining whether a third distance of movement of the gaze position in a direction opposite to a direction in which the text is read matches the reference value; and
- storing data representing that the first line has been read in a data storage when the third distance matches the reference value.

12. A computer-readable recording medium storing a program that causes a computer to execute a procedure, the procedure comprising:
- calculating a distance between an end of a first line in a reading object displayed on a display screen and a beginning of a second line following the first line in the reading object;
- setting a condition, based on the first distance and a first threshold specifying a readable range without moving a gaze position by a user, for detecting movement of a gaze position of the user on the display screen, and
- determining whether the reading object has been read by the user based on the detecting movement of the gaze position of the user on the display screen.

* * * * *